US006656396B2

(12) United States Patent
Reichinger

(10) Patent No.: US 6,656,396 B2
(45) Date of Patent: Dec. 2, 2003

(54) METHOD FOR PRODUCING A PARTICULARLY DIMENSIONALLY STABLE CABLE SET, AS WELL AS A FOAMING TOOL FOR PRODUCING SUCH A CABLE SET

(75) Inventor: Gerhard Reichinger, Rednitzhembach (DE)

(73) Assignee: Leoni Bordnetz-Systeme GmbH & Co., Nürnberg (DE)

( * ) Notice: Subject to any disclaimer, the term of this patent is extended or adjusted under 35 U.S.C. 154(b) by 177 days.

(21) Appl. No.: 09/930,477

(22) Filed: Aug. 16, 2001

(65) Prior Publication Data

US 2002/0033549 A1 Mar. 21, 2002

(30) Foreign Application Priority Data

Aug. 16, 2000 (DE) ........................................ 100 39 879

(51) Int. Cl.[7] .......................... B29C 44/06; B29C 44/12

(52) U.S. Cl. .................... 264/40.3; 264/46.4; 264/46.7; 264/102; 264/271.1

(58) Field of Search ................................ 264/46.4, 101, 264/102, 40.3, 46.7, 271.1

(56) References Cited

U.S. PATENT DOCUMENTS 3,619,447 A * 11/1971 Kerna et al. ................ 264/102
4,468,435 A * 8/1984 Shimba et al. .............. 428/383
4,676,996 A * 6/1987 Brotz ......................... 427/113
4,923,537 A 5/1990 Matsushima
6,071,446 A * 6/2000 O'Brien et al. ............ 264/46.5
6,120,327 A * 9/2000 O'Brien et al. ............. 439/623

FOREIGN PATENT DOCUMENTS

| | | | |
|---|---|---|---|
| DE | 1961830 | A1 | 6/1971 |
| DE | 3431617 | C2 | 5/1988 |
| DE | 3924063 | A1 | 1/1991 |
| DE | 19717239 | C1 | 12/1998 |
| EP | 0950491 | A3 | 10/1999 |
| GB | 2160028 | A | 12/1985 |

* cited by examiner

*Primary Examiner*—Allan R. Kuhns
(74) *Attorney, Agent, or Firm*—Venable LLP; Norman N. Kunitz

(57) ABSTRACT

For the production of a particularly dimensionally stable cable set, the single conductors (22) of the cable set are initially inserted into a cavity (8) of a foam tool (2) and a foaming material is subsequently filled in. To dispense with involved and expensive hydraulic equipment, a vacuum is generated to press a top half (6) and a bottom half (4) of the foaming tool (2) against each other. For this, vacuum channels (6) are preferably provided, which extend along sides of the cavity (8).

4 Claims, 3 Drawing Sheets

METHOD FOR PRODUCING A PARTICULARLY DIMENSIONALLY STABLE CABLE SET, AS WELL AS A FOAMING TOOL FOR PRODUCING SUCH A CABLE SET

BACKGROUND OF THE INVENTION

The invention relates to a method for producing a particularly dimensionally stable cable set or assembly, as well as a foaming tool for realizing this method.

A dimensionally stable cable set (DSC) generally refers to a cable set, meaning a bundle of single conductors, which cable set has a predetermined geometry and is dimensionally stable. In order to produce the dimensionally stable cable set, the single conductors are generally inserted into a special mold, the so-called foaming tool. A foaming material, which is initially in a liquid state, is subsequently poured around these conductors. Polyurethane (PU) foam is preferably used for this. A dimensionally stable cable set of this type is used especially in motor-vehicle engineering and functions as a prefabricated structural unit for running electrical lines inside the motor vehicle. The geometric boundary conditions predetermined by the motor vehicle construction, meaning the space conditions and the predetermined paths for the cable set, are taken into consideration when producing the set as a dimensionally stable unit.

As a result of the generated foam, pressure forces are exerted onto the foaming tool. The foaming tool therefore must exert a counter pressure in order to impress the shape, predetermined by the foaming tool, onto the cable set and to prevent the foam from flowing out of the mold. For that reason, traditional foaming tools have respectively a solid bottom half and top half that are pressed together with the aid of involved hydraulic equipment. Due to the high forces that the foaming tool must withstand, the top half and the bottom half must be designed to be extremely solid and of heavy construction.

The object of the invention is to make possible a simple production of a particularly dimensionally stable cable set.

SUMMARY OF THE INVENTION

According to the invention, the above object generally is solved with a method for producing a particularly dimensionally stable cable set, having a number of single conductors that are inserted into the cavity of a foaming tool. The foaming tool comprises a top half and a bottom half between which the single conductors are inserted. A vacuum is generated between the top half and the bottom half and a foaming material injected into the cavity, so that foam surrounds the single conductors.

This embodiment is based on the idea of using low pressure (a vacuum) to press the two foaming tool halves against each other instead of using outside pressure forces. One decisive advantage of this method is that the expensive and involved hydraulic equipment can be dispensed with and that the foaming tool clearly has a lighter and simpler design. In particular, it is possible to use a plastic tool in place of the metal tool, required so far, or to produce at least one of the two halves from plastic.

The vacuum preferably is adjusted inside the cavity. According to one preferred modification, the space beside the cavity, between the two halves, is additionally or alternatively provided with a vacuum. A vacuum space is provided for this, inside of which the vacuum can be generated.

As a result, the regions of the upper half and the lower half that flank the cavity are also pressed together firmly.

The vacuum space is preferably provided in the form of vacuum channels that extend along the cavity, so that the tool halves (upper half and lower half) are pressed securely and firmly against each other along the cavity, which generally has a long stretched-out shape.

Based on one useful modification, different vacuum levels are adjusted in the cavity and the vacuum space, wherein a lower pressure is adjusted in the cavity, in particular, than in the vacuum space. As a result, the cavity retains its desired shape and is not deformed, for example due to an excessively high vacuum. At the same time, it is possible to adjust an extremely high vacuum inside the vacuum space, which ensures that the tool halves are securely pressed against each other and fit tightly against each other. The so-called flashes are thus for the most part avoided. These flashes form because a certain amount of the foaming material is pressed during the foaming operation into the sealing surface between the tool halves. Flashes of this type, which are also called filmy skins, generally must be removed later on with costly and involved reworking operations.

For the same reason, namely to prevent the development of flashes, different vacuums are preferably adjusted in various partial areas of the vacuum space. The vacuum space is thus divided into different partial areas. The vacuum values can be adjusted independent of each other, meaning optionally, in the partial vacuum spaces, as well as in the cavity itself. The essential advantage of having separate partial spaces is that a higher vacuum can specifically be adjusted in regions where flashes occur, so that the forces for pressing together the tool halves can be increased. Thus, the contact pressure forces between the top half and the bottom half are increased in those areas where flashes occur. The vacuum channels extending along both sides of the cavity represent partial spaces of this type. If different vacuums are adjusted in these vacuum channels, then the two tool halves are pushed together more on one side than on the other. This results in a so-to-speak slight "tilting" of the upper half relative to the lower half, away from the parallel alignment.

It is advantageous if the vacuum inside the cavity is monitored during the filling of the foaming tool to prevent a deformation of the cavity, as well as the formation of air bubbles. In particular, no vacuum or only a slight vacuum is adjusted in the cavity at the start of the process, meaning when the foaming material is initially introduced. With increasing foam formation, the foam displaces the air trapped inside the cavity and there is danger that air bubbles will form. In that case, the pressure inside the cavity is monitored during the process and, for example, is maintained at a specific value. The air that is condensed as a result of the foaming is drawn off, so-to-speak, to prevent the forming of air bubbles.

According to another preferred embodiment, an opening in the foaming tool toward the cavity is automatically closed once a specific pressure value inside the cavity is exceeded, so as to prevent foam from leaking out.

The object is furthermore solved according to the invention with a foaming tool for a particularly dimensionally stable cable set. The foaming tool comprises a bottom half and a top half that form a cavity for inserting a number of single conductors for the cable set when they are pressed together, wherein a vacuum can be generated between the bottom half and the top half.

The preferred embodiments and advantages listed for this method must also be transferred by analogy to the foaming tool.

According to one preferred modification, the foaming tool is provided with a number of adjacent vacuum channels. As a result, both tool halves are pressed together over a comparably large area. Owing to the fact that each of the vacuum channels additionally has a quasi-sealing function, a type of sealing cascade is obtained if several vacuum channels are arranged next to each other.

To obtain the best possible seal, it is advantageous if the top half and the bottom half interlock in accordance with the tongue-and-groove principle. A number of adjacent tongue-and-groove seals are preferably provided for this.

For the same purpose of obtaining a better seal, a sealing element is preferably provided between the upper half and the lower half, directly bordering the cavity area. This sealing element in particular is designed as a separate element and preferably consists of a special sealing material such as rubber.

Additional preferred embodiments of the foaming tool follow from the dependent claims.

Exemplary embodiments of the invention and additional modified designs of the foaming tool are explained in further detail in the following with the aid of Figures, which show respectively in schematic representations:

DESCRIPTION OF THE PREFERRED EMBODIMENTS

Figure 1:
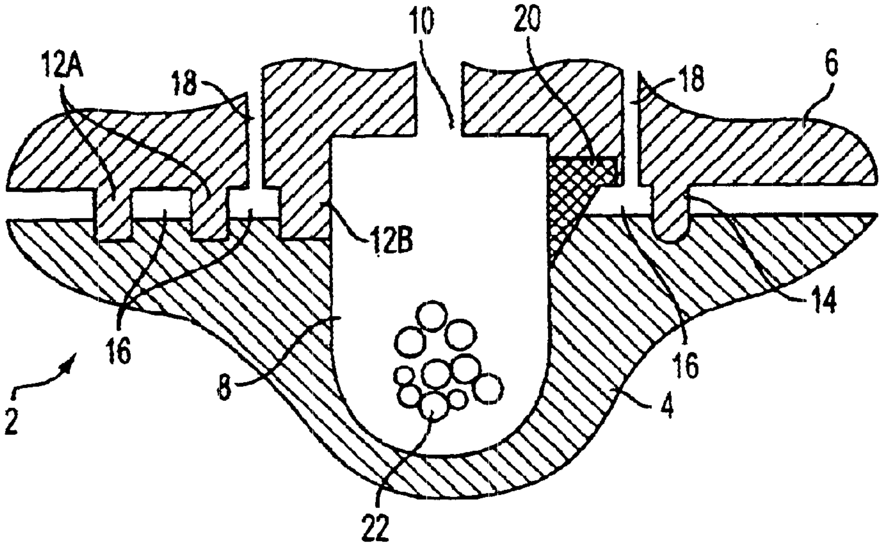
FIG. 1 is a cross section through a foaming tool according to the invention.

A foaming tool 2 according to FIG. 1 comprises a bottom half 4 and a top half 6, which enclose a cavity 8 when they are joined. The top half 6 is provided with an opening 10, leading to the cavity 8. The opening 10 makes it possible to generate a low pressure (vacuum) inside the cavity 8. In addition, the opening 10 can also serve as filling opening for a foaming material (PU foam) or even as a ventilation opening.

The facing surfaces of the top half 6 and the bottom half 4 respectively have a profiled design, so that they interlock based on the tongue-and groove principle. The profiling is shown on the left picture side with a toothed or pronged design for the top half 6, with first teeth 12A and a second tooth 12B, showing an angular cross-sectional geometry. On the right picture side, a tongue 14, provided as an alternative embodiment, is rounded in the direction of the bottom half 4. The teeth 12A, 12B or the tongue 14 are dimensioned such that vacuum channels 16, which represent the vacuum space, are formed between the top half 6 and the bottom half 4, along both sides of the cavity 8. The vacuum connections 18, to which a vacuum pump (not shown) can be connected, respectively lead to these vacuum channels 16, so that a vacuum can be generated inside the vacuum channels 16.

In addition to forming the vacuum channels 16, the teeth 12A, 12B as well as the tongue 14 also result in a good positioning or self-adjustment of the two halves relative to each other. Moreover, the tooth 12B in particular, which directly adjoins the cavity 8, assumes a sealing function between the top half 6 and the bottom half 4, to prevent foam from leaking out. As an alternative to the embodiment with a fixedly molded-on tooth 12B, a separate sealing element 20 can also be provided for the seal, which element is preferably wedge-shaped as shown on the right side of FIG. 1. The sealing element in this case preferably is composed of a different material than the foaming tool 2, for example a silicon sealing material.

The seal in particular functions to avoid the so-called filmy skins or flashes. These form when a foaming material that is introduced into the cavity 8 enters the sealing gap between the top half 6 and the bottom half 4. Flashes of this type are undesirable and require an involved and costly subsequent reworking. One essential criteria for avoiding the flashes is that the lower half 4 and the upper half 6 are pressed together so as to form a seal. The pressure for pushing together the halves 4, 6 is adjusted primarily through the vacuum level in the vacuum channels 16. Thus, several vacuum channels 16 are preferably arranged side-by-side for a particularly good seal, as shown in the left picture half, so as to increase the pressing forces, as well as to provide the pressing forces over a larger local area. The picture on the left side of FIG. 1 shows that two vacuum channels 16 are provided, which are respectively formed between two teeth 12A, 12B. A type of sealing cascade is realized with this embodiment.

In order to produce a dimensionally stable cable set, a number of single conductors 22 are inserted into the cavity 8 and the cavity 8 is subsequently filled with a foaming material that is not shown in further detail herein. The foaming material then expands inside the cavity 8 and assumes the shape predetermined by the cavity 8. The halves 4, 6 are held against each other by creating a vacuum inside the cavity 8 and/or in the vacuum channels 16 on the side, thus dispensing with the requirement of using involved hydraulic equipment for pressing together the halves 4, 6 from the outside. A higher vacuum is preferably generated in the vacuum channels 16 on the side than in the cavity 8 to achieve a sufficiently high pressing force, as well as to prevent the deformation of the cavity 8 through an excessively high vacuum.

The foaming tool 2 consists preferably of an easy to produce hard plastic reinforced with glass fiber or, possibly, with an inserted metal bracing. The tool requires only supporting legs, but not a level supporting surface, so that it can be filled in the correct position. A saving in weight and curing time can thus be realized. The material for producing the foaming tool 2, particularly the lower half 4, is hard and has the lowest possible heat expansion. In contrast, the top half 6 is designed to be elastic to ensure a sufficient sealing function. The top half 6 simultaneously has sufficient inherent rigidity, so that it is not pulled toward the inside in the presence of a vacuum. Reinforcement elements are preferably provided to achieve this inherent rigidity, which encompass the foaming tool in particular.

The top half 6 preferably is made of a transparent plastic, at least for experimental purposes, which permits following the foam expansion process when testing a new foaming tool 2. As a result, it is possible to detect the formation of air bubbles during the foam expansion and to determine the best locations for installing the ventilation openings.

Since no involved hydraulic equipment is furthermore required, it suggests itself, for example, to position the complete foaming tool 2 somewhat at a slant, so that air bubbles form at a predetermined location, provided they form at all given the existing vacuum. A ventilation option is created in particular in the top region of the cavity 8.

To prevent the forming of air bubbles during the foaming process, the vacuum inside the cavity 8 is preferably monitored and changed, so that a sufficiently vacuum level is always maintained. The advantage in this case is that no vacuum or only a slight vacuum must exist in the cavity 8 at the start of the foaming process. As a result, a deformation of the cavity 8 due to an excessively high vacuum level is prevented. The necessary contact pressure forces between the top half 6 and the bottom half 4 are therefore caused primarily by the vacuum in the vacuum channels 16 on the side.

The use of a transparent top half 6 makes it possible to monitor the development of air bubbles and thus also the suitable adjustment of the vacuum inside the cavity 8. The monitoring for air bubbles preferably occurs automatically, wherein optical methods in particular are used for this. Ultrasound methods can furthermore be used for this as well. The automatic monitoring preferably also permits an automatic control or regulation of the vacuum conditions, in particular inside the cavity 8.

Owing to the low weight, the complete foaming tool 2 can furthermore be allowed to vibrate in order to avoid air bubbles, so that possibly developing air bubbles are "shaken out" of the foaming material.

Figure 2:
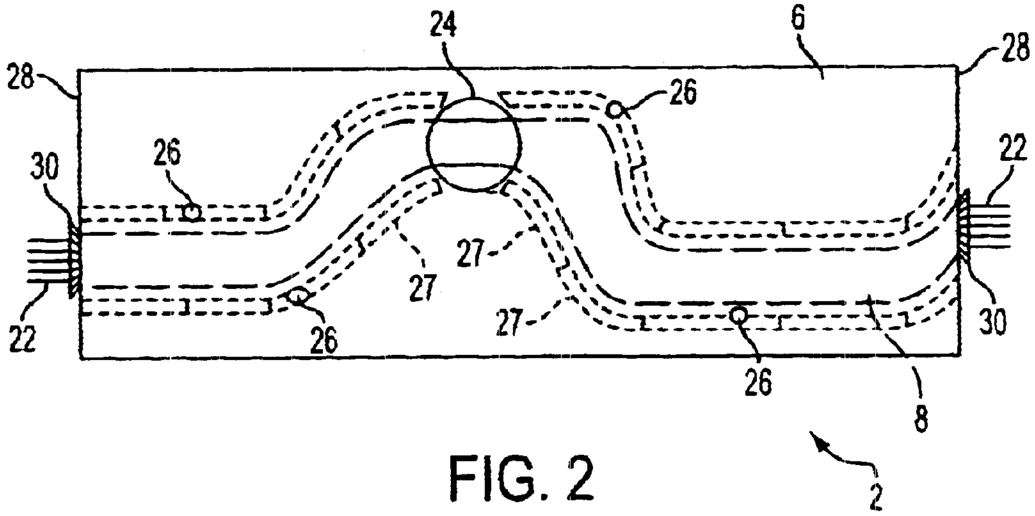
FIG. 2 is a view from above of an upper half of a foaming tool according to the invention.

A filling pipe 24 is visible in the view from above of the top half 6 of the foaming tool 2 shown in FIG. 2. The foaming material is filled in via this pipe 24, which is also called a slug. In addition, ventilation bores 26 are indicated at several locations.

The course of the cavity 8 inside of the foaming tool 2 is shown with dashed lines and that of the vacuum channels 16 on the side is shown with dotted lines. The course of the vacuum channels 16 on the side preferably follows essentially the course of the cavity 8. The vacuum channels 16 on the side are subdivided into a number of partial spaces 27, as indicated in FIG. 2 with dividing lines in the vacuum channels 16. The two vacuum channels 16 shown herein, as well as the individual partial spaces 27 preferably have individual vacuum levels that are independent of each other and should be optionally adjustable. As a result, it is possible to purposely adjust the contact pressure locally and, in particular to raise this contact pressure, e.g. to prevent the forming of flashes.

The single conductors 22 are guided out of the foaming tool 2 at the ends 28. The respective outlet openings are sealed with the aid of outlet seals 30 to prevent foam from leaking out.

Valves 31 are preferably provided to prevent foam from leaking out of the ventilation bores 26 and/or the filling pipe 24. Different valve designs are shown in FIGS. 3 to 5.

A foaming tool 2 of this type has the following particular advantages as compared to a traditional foaming tool:

- The foaming tool 2 is comparably cheap because no pressure-closing system is required.
- By designing the bottom half 4 and the top half 6 so that they form a seal based on the tongue and groove principle, the development of flashes is prevented between these two halves 4, 6.
- The vacuum will prevent or at least reduce the development of air bubbles. In addition, the development of air bubbles in the experimental stage can be monitored easily during the foaming process.

Figure 3:
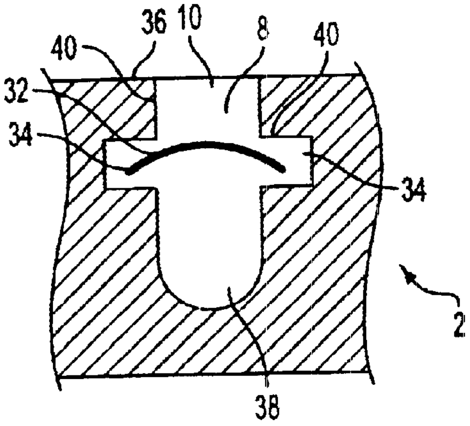
FIGS. 3 to 5 are different designs for sealing options for a ventilation hole and/or a filling pipe.
Figure 4:
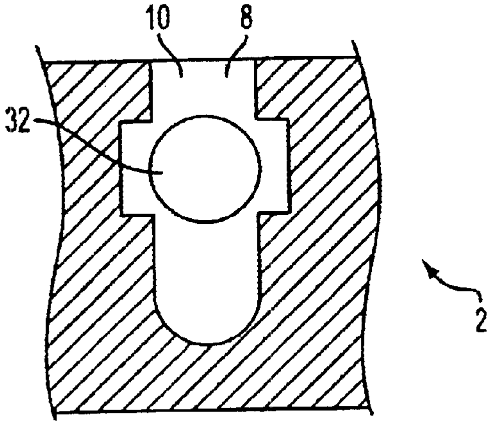
Figure 5:
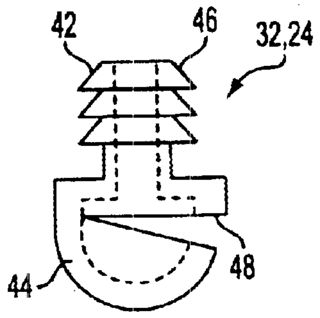

According to FIGS. 3 and 4, the valve 31 is formed as a result of the approximately cross-shape design of the cavity 8 in the cross section, in which a sealing element 32 is arranged. According to FIG. 3, the sealing element 32 is a curved element that extends into the side openings 34 of the cross-shaped cavity 8. The curvature in this case is preferably directed toward the top 36, from which the cavity 8 is filled with the foaming material. Thus, the foaming material can flow along the sealing element 32 during the filling operation and can reach the lower region 38 of the cavity 8. If the material expands through foaming, the sealing element 32 is pushed upward and is pressed against the upper limiting edges 40 of the side openings 38. In the process, the limiting edges 40 function as sealing seat. The vacuum existing in the cavity 8 in this case helps the air inside the cavity 8 to escape via the opening 10 during the foaming process. It also prevents the sealing element 32 from being pressed against the upper limiting edges 40 due to the air bolster that develops during the foaming inside the cavity 8.

According to FIG. 4, a sealing element 32 with circular cross section is provided in place of the curved sealing element 32 shown in FIG. 3. The operating principle in this case is similar to the one for the sealing element 32 according to FIG. 3. During the foaming operation, this sealing element 32 with circular cross section is also pushed against the limiting edges 40 to prevent foam from leaking out of the opening 10.

A different variant of the valve 31 according to FIG. 5 is designed in the manner of a champagne cork that is cut open. "Champagne cork seals" of this type are easy to produce and are therefore also very cheap. In addition, they can be installed quickly on the foaming tool 2. It therefore suggests itself to provide a valve 31 of this type as one-way valve or as one-way seal. The valve has an upper hollow-cylindrical region 42, which is followed on the underside by a closing flap 44, of the type of a return flap. The valve 31 shown in FIG. 5 in particular can be used as a self-sealing filling pipe 24 and, as such, is inserted into an opening 10 in the foaming tool 2. For a secure seat inside such an opening, the upper hollow-cylindrical region 42 is provided with barbs 46. The foaming material is poured in through the inside of the hollow cylindrical region 42 and can penetrate from the lower end into the cavity 8 because the closing flap 44 is folded down. Once foam material expands in the cavity 8, it pushes against the closing flap 44, which is thus pivoted upward and is pressed against a sealing seat 48 that is arranged at the lower end of the hollow-cylindrical region 42. With the valves 31, shown in FIGS. 3–5, the foam is prevented from leaking out while the vacuum is simultaneously maintained until the highest filling point is reached.

Figure 6:
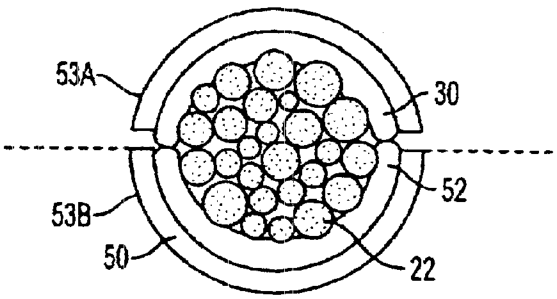
FIG. 6 is a cross-sectional view of an outlet area on the foaming tool, provided with an outlet seal.

FIG. 6 shows a cross section through the outlet seal 30 that encloses the single conductors 22. The outlet seal 30 is provided with a ring-shaped outer seal carrier 50, in particular made of a hard and rigid material. A sealing component 52 that can be pressed against the single conductors 22 is arranged on its inside of the seal carrier 50 and is oriented toward the single conductors 22. The outlet seal 30 is divided into two halves 53A, B that can be separated.

Figure 7:
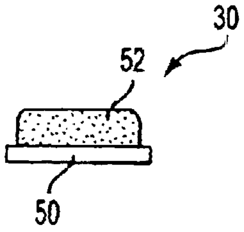
FIGS. 7 to 10 show different designs for the outlet seal.
Figure 8:
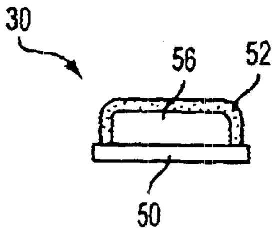
Figure 9:
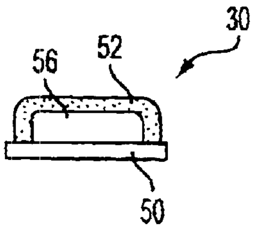
Figure 10:
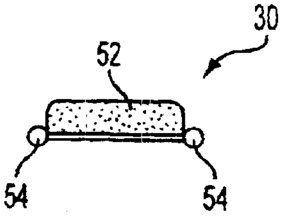

The different design variants for the outlet seal 30 are shown in FIGS. 7 to 10. All design variants use the same rigid seal carrier 50, on which the actual sealing component 52 is arranged. The rigid seal carrier 50 according to FIG. 10 is provided with wires 54 that extend along both sides, meaning it is wire-reinforced. A soft material can be stretched between the two wires, such as is generally used as a sealing means for food packages, for which paper or a thin plastic foil is stretched between the wires. The sealing component 52 is designed as a soft, elastic sealing component, made for example from rubber or silicon, as indicated in FIGS. 7 and 10. The sealing component 52 in this case is made of solid material. In contrast, the sealing component 52 according to FIGS. 8 and 9 encloses a hollow inside space 56. The sealing component 52 according to FIG. 9 is made of a hard-elastic material. With respect to the sealing component 52 according to FIG. 8, an excess pressure is generated in the inside space 56, so that the sealing component 52 is pressed against the single conductors 22 to provide a secure seal for these.

The specific structural design of the foaming tool 2 can in principle be used for all foaming tools, for which a cavity 8 is formed by pressing mold halves against each other and where a material to be molded is introduced into the mold cavity. A foaming tool of this type is therefore suitable for a plurality of molding methods where the mold halves must be pressed together. The decisive advantage in this case is that no outside pressure must be applied. The molding tool is therefore particularly suitable for producing large molded parts, e.g. those with a longitude expansion of more than 0.5 m.

The invention being fully described, it will be apparent to one of ordinary skill in the art that many changes and modifications can be made thereto without departing from the spirit or scope of the invention as set forth herein.

REFERENCE NUMBER LIST

2 foaming tool
4 bottom half
6 top half
8 cavity
10 opening
12A, B teeth; prongs
14 tongue
16 vacuum channel
18 vacuum connection
20 sealing element
22 single conductors
24 filling pipe
26 ventilation bore
27 partial spaces
28 end side
30 outlet seal
32 sealing element
34 opening on the side
36 top
38 lower region
40 limiting edge
42 hollow-cylindrical region
44 closing flap
46 barb
48 sealing seat
50 seal carrier
52 sealing component
53A, B halves that can be separated
54 wires
56 inside space

What is claimed is:

1. A method for producing a particularly dimensionally stable cable set having a plurality of single conductors, said method comprising: inserting the plurality of conductors into a cavity of a foaming tool that comprises a top half and a bottom half; generating a vacuum, which is effective between the bottom half and the top half to seal the cavity, inside a vacuum space arranged adjacent to the cavity and provided by vacuum channels on the side and along the length of the cavity; and, introducing a foaming substance into the cavity to surround the plurality of single conductors with foam.

2. A method for producing a particularly dimensionally stable cable set having a plurality of single conductors, said method comprising: inserting the plurality of conductors into a cavity of a foaming tool that comprises a top half and a bottom half; generating a vacuum, which is effective between the bottom half and the top half to seal the cavity, inside a vacuum space arranged adjacent to the cavity; introducing a foaming substance into the cavity to surround the plurality of single conductors with foam; additionally generating a vacuum in the cavity; and adjusting different vacuums inside the cavity and in the vacuum space, with a lower vacuum being adjusted in the cavity than in the vacuum space.

3. A method for producing a particularly dimensionally stable cable set having a plurality of single conductors, said method comprising: inserting the plurality of conductors into a cavity of a foaming tool that comprises a top half and a bottom half generating a vacuum, which is effective between the bottom half and the top half to seal the cavity, inside a vacuum space arranged adjacent to the cavity; introducing a foaming substance into the cavity to surround the plurality of single conductors with foam; and adjusting different vacuums in different partial regions along the vacuum space.

4. A method for producing a particularly dimensionally stable cable set having a plurality of single conductors, said method comprising: inserting the plurality of conductors into a cavity of a foaming tool that comprises a top half and a bottom half; generating a vacuum in the cavity that is effective between the bottom half and the top half to seal the cavity; introducing a foaming substance into the cavity to surround the plurality of single conductors with foam; monitoring the vacuum inside the cavity during the filling of the foaming tool; and automatically closing an opening in the foaming tool to the cavity if a given pressure value inside the cavity is exceeded.

* * * * *